United States Patent
Bolourchi et al.

(10) Patent No.: US 7,836,991 B2
(45) Date of Patent: Nov. 23, 2010

(54) PARKING ASSIST SYSTEM WITH STEERING CUES

(75) Inventors: Farhad Bolourchi, Novi, MI (US); Steven L. Tracht, Howell, MI (US); Scott Millsap, Grand Blanc, MI (US); Timothy W. Kaufmann, Frankenmuth, MI (US); Jon D. Demerly, Byron, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 12/170,902

(22) Filed: Jul. 10, 2008

(65) Prior Publication Data

US 2009/0014227 A1    Jan. 15, 2009

Related U.S. Application Data

(60) Provisional application No. 60/949,299, filed on Jul. 12, 2007.

(51) Int. Cl.
*B60S 9/00* (2006.01)
(52) U.S. Cl. ............... 180/204; 180/167; 180/169; 701/41
(58) Field of Classification Search .......... 180/204, 180/167, 169
See application file for complete search history.

(56) References Cited

U.S. PATENT DOCUMENTS

| 3,117,642 | A | 1/1964 | Larinoff |
| 6,524,203 | B2* | 2/2003 | Kawamoto et al. ......... 474/144 |
| 6,895,318 | B1* | 5/2005 | Barton et al. ............. 701/42 |
| 7,356,396 | B2 | 4/2008 | Mori et al. |
| 7,486,203 | B2* | 2/2009 | Tanaka et al. .......... 340/932.2 |
| 2004/0262063 | A1* | 12/2004 | Kaufmann et al. ......... 180/169 |
| 2007/0051547 | A1* | 3/2007 | Fischer et al. ............ 180/204 |
| 2007/0282499 | A1* | 12/2007 | Maeda et al. ............. 701/41 |

FOREIGN PATENT DOCUMENTS

EP    1160146 B1    5/2006

* cited by examiner

*Primary Examiner*—Tony H. Winner
*Assistant Examiner*—Jacob Knutson
(74) *Attorney, Agent, or Firm*—Cantor Colburn LLP

(57) ABSTRACT

Disclosed is a method for assisting the parking of a vehicle. The method includes determining a vehicle position relative to an obstacle. When the relative position meets a first set of criteria, a first torque pulse is delivered to the steering wheel in the first direction to cue an operator of the vehicle to turn the steering wheel in the first direction. When the relative position meets a second set of criteria, a second torque pulse is delivered to the steering wheel in the second direction, opposite to the first direction to cue the operator to turn the steering wheel in the second direction. A system for assisting the parking of a vehicle is also disclosed.

26 Claims, 6 Drawing Sheets

PARKING ASSIST SYSTEM WITH STEERING CUES

CROSS REFERENCE TO RELATED APPLICATION

The present application claims priority to U.S. Provisional Patent Application Ser. No. 60/949,299, filed Jul. 12, 2007, the entire contents of which are specifically incorporated herein by reference.

TECHNICAL FIELD

The present invention generally relates to vehicle steering systems of, for example, automobiles, boats, etc. More particularly, the present invention relates to parking assist features of vehicle steering systems.

BACKGROUND OF THE INVENTION

Parking a vehicle properly can be difficult at times. Parallel parking especially poses challenges to many drivers when, for example, the parking space is small or other conditions such has curb variations, adverse weather, moving obstacles, grade variations, etc. exist. Other parking maneuvers, such as 90 degree back up parking, often present similar challenges to drivers.

Recently, parking assist systems have been developed to assist drivers in these tasks. The developed systems have focused on either (a) controlling the motion of the steering wheel while control of braking and acceleration is left to the driver, (b) providing audial/visual guidance to the driver regarding motion of the steering wheel, or (c) controlling the motion of the steering wheel as well as controlling braking and acceleration of the vehicle. Options (a) and (c), by removing some or all control from the drivers during parking maneuvers, require very robust systems that can compensate for all of the potential variations in the parking situation such as those listed above. Current systems of this type have a narrow range of operability and/or only function within large parking areas. Furthermore, acceptance of systems that entirely remove control of the vehicle from the driver, as in option (c), may be difficult because of potential liability issues.

Option (b) leaves control of the vehicle with the driver, but the driver must process the audial/visual cues and convert those cues into motion of the steering wheel. Further, visual cues displayed forward of the driver, for example, on the dashboard, seem contradictory to the premise of the driver remaining in control while driving the vehicle backward.

SUMMARY OF THE INVENTION

A method for assisting the parking of a vehicle includes determining a vehicle position relative to an obstacle. When the relative position meets a first set of criteria, a first torque pulse is delivered to the steering wheel in the first direction to cue an operator of the vehicle to turn the steering wheel in the first direction. When the relative position meets a second set of criteria, a second torque pulse is delivered to the steering wheel in the second direction, opposite to the first direction to cue the operator to turn the steering wheel in the second direction.

A system for assisting the parking of a vehicle includes at least one sensor for determining a position of a vehicle relative to an obstacle and a torque generator in operable communication with a steering wheel. When the position of the vehicle relative to the obstacle meets a first set of criteria, the torque generator is capable of delivering a first torque pulse to the steering wheel in the first direction to cue an operator of the vehicle to turn the steering wheel in the first direction. When the position of the vehicle relative to the obstacle meets a second set of criteria, the torque generator is capable of delivering a second torque pulse to the steering wheel in the second direction, opposite to the first direction to cue the operator to turn the steering wheel in the second direction.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
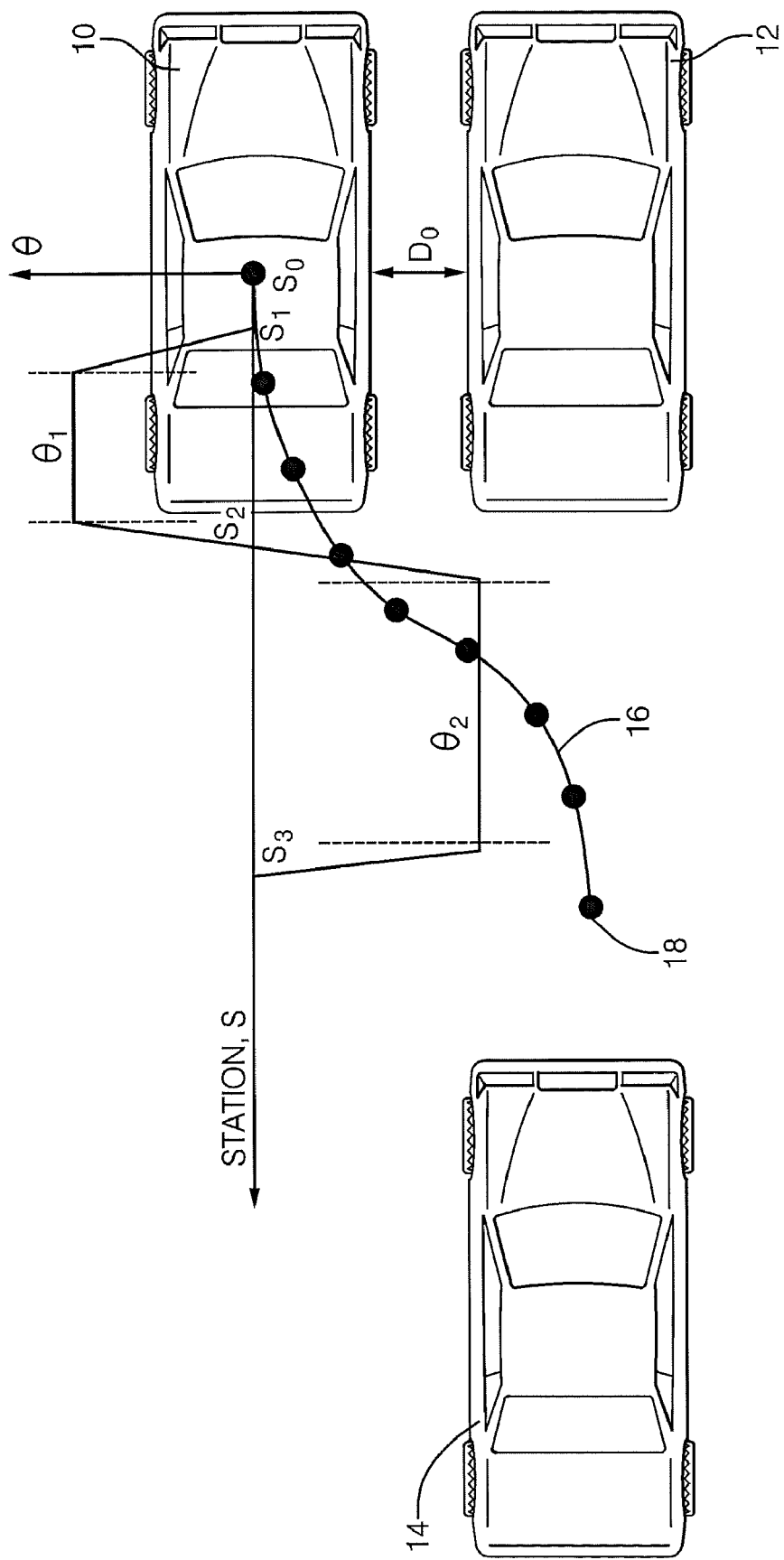
FIG. 1 is a plan view of a typical parallel parking situation.

A parking assist system is disclosed that provides cues to the driver through torque pulses delivered through the steering wheel. This can be achieved with, for example, an electric or hydraulic actuator or the like. FIG. 1 illustrates a typical parallel parking situation. Vehicle 10 is attempting to park between parked vehicles 12 and 14. Profile 16 is a desired path of a center of gravity 18 of the vehicle 10. Further in FIG. 1, steering wheel angle ($\theta$) versus vehicle station (S) along the profile 16 is plotted, and illustrates the angles $\theta_1$ and $\theta_2$ that a driver may turn the steering wheel at stations $S_1$ and $S_2$, respectively, in order to successfully maneuver the vehicle 10 between parked vehicles 12 and 14.

A determination is made preliminarily and/or during the parking maneuver as to whether the vehicle 10 can possibly be parked in an available space between parked vehicles 12 and 14. This determination can be made by the driver alone or, in some embodiments, by the parking assist system which may then communicate the determination to driver through visual and/or audial cues.

Figure 2:
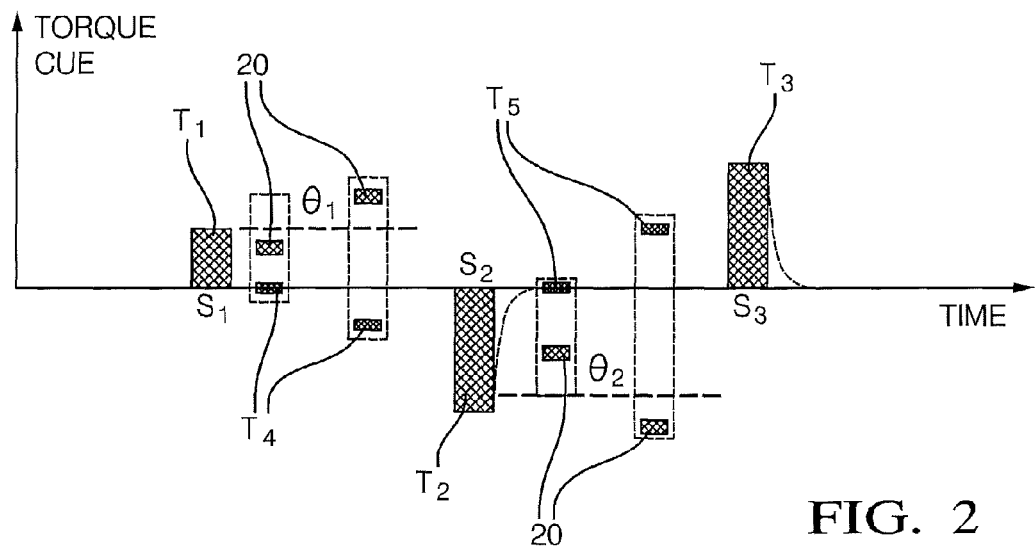
FIG. 2 is a graph of torque cues provided over time by an embodiment of a steering assist system of the present invention.
Figure 3:
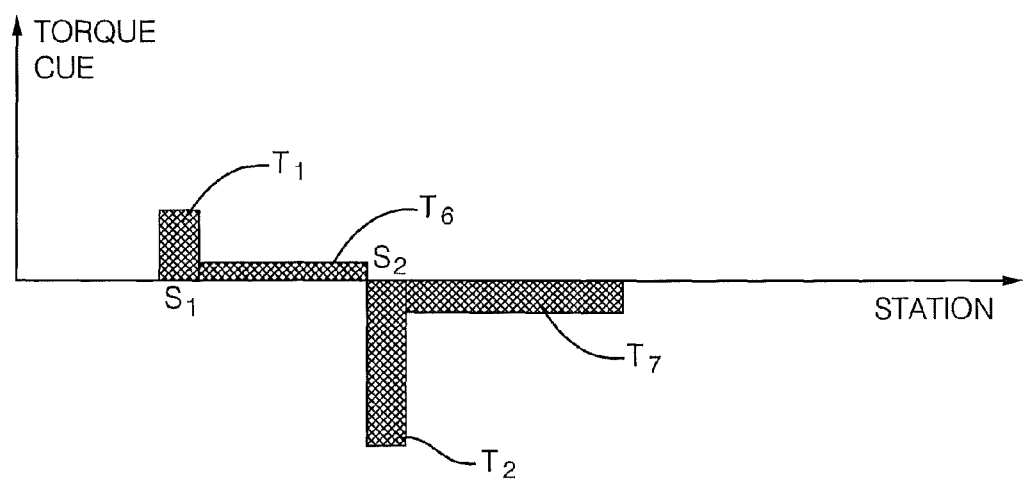
FIG. 3 is an alternative torque cue configuration including bias torques for the system of FIG. 2.

The system of the present invention assists the driver in determining when they have reached station $S_1$ and the steering wheel is to be turned to angle $\theta_1$. As shown in FIG. 2, the system provides a pulse of torque, $T_1$, through the steering wheel in the direction the steering wheel is to be turned. In reaction to $T_1$, the driver then turns the steering wheel to angle $\theta_1$, which is normally the end of the travel of the steering wheel.

As the vehicle 10 continues to $S_2$, another pulse of torque, $T_2$, is delivered to the steering wheel indicating to the driver that it is time to turn the steering wheel to $\theta_2$. $T_2$ is delivered in the opposite direction of $T_1$ since the direction of turn of the steering wheel is opposite at $S_2$ compared with $S_1$. Further, the magnitude of the torque pulse $T_2$ is greater than the magnitude of the torque pulse $T_1$. As the vehicle 10 moves from a staging station, $S_0$, to $S_1$, the vehicle 10 is moving substantially directly rearward thus a driver applied torque to the steering wheel during this portion of the parking is minimal. As a result, a small magnitude of torque $T_1$ can be applied by the parking assist system and it will be perceived by the driver. When $T_2$ is applied, however, the driver is inputting significant torque into the system in turning the steering wheel to $\theta_1$. Therefore, for the driver to perceive $T_2$, the magnitude of $T_2$ must be greater than that of $T_1$. In the case of a pulse with a larger magnitude such as $T_2$, instead of being a pulse having an abrupt end, the pulse may have a gradual end since an abrupt end may cause an oversteer-like sensation for the driver. Further, an additional impulse, $T_3$, may be provided at station $S_3$ as a signal to the driver to straighten the vehicle and complete the parallel parking maneuver in a forward motion.

In some parallel parking situations, an initial lateral offset, $D_0$, between vehicle 10 and parked vehicle 12 is large enough or, there may be an adjacent vehicle in traffic so that a $\theta_1$ of the complete travel of the steering wheel is not necessary or is determined to be inappropriate by the system. After $T_1$ is delivered and the driver responds by turning the steering wheel in the suggested direction, if the driver turns the steering wheel to an actual angle 20 that is less than $\theta_1$, the system will not provide additional $T_1$ in the form of pulses or constantly varying torque. If, however, the driver attempts to turn the steering wheel to an actual angle greater than $\theta_1$, the system will respond with a torque $T_4$ to give the driver a perception that the end of steering wheel travel has been reached. System intervention in this case is continuous of a magnitude in proportion to an amount of overturning and one sided. $T_4$ is only provided when attempting to go beyond $\theta_1$, not when failing to reach $\theta_1$, so that the driver does not have the perception that the system is taking control from him/her. Similarly, if the driver attempts to turn the steering wheel to an actual angle 20 greater than $\theta_2$ or attempts to turn the steering wheel to $\theta_2$ prior to reaching $S_2$, the system will respond with a continuous torque $T_5$ to resist the driver's input. Again, it should be noted that $T_1$, $T_2$, and $T_3$ are, in some embodiments, singular events while $T_4$ and $T_5$ may be transient or repetitive in nature.

An alternative for providing additional assistance to the driver is to provide a first bias torque, $T_6$, subsequent to $T_1$, and a second bias torque, $T_7$, subsequent to $T_2$. $T_6$ is in the same direction as $T_1$, but is longer in duration and of lesser magnitude than $T_1$. Likewise, $T_7$ is in the same direction as $T_2$, but is longer in duration and of lesser magnitude than $T_2$. In some embodiments, $T_7$ is of greater magnitude than $T_6$ because, as described above, the driver may be inputting significant torque in an opposite direction of $T_7$ during the first turn, so a greater magnitude $T_7$ is necessary to have a desired effect. Because of their longer durations and lesser magnitudes, the effect of the bias torques, $T_6$ and $T_7$, is different from the effect of $T_1$ and $T_2$. $T_1$ and $T_2$ are meant to alert the driver to turn the steering wheel in the desired direction, while $T_6$ and $T_7$ provide a level of assistance in parking that may not be readily perceived, thus may be acceptable, to most drivers.

Figure 4:
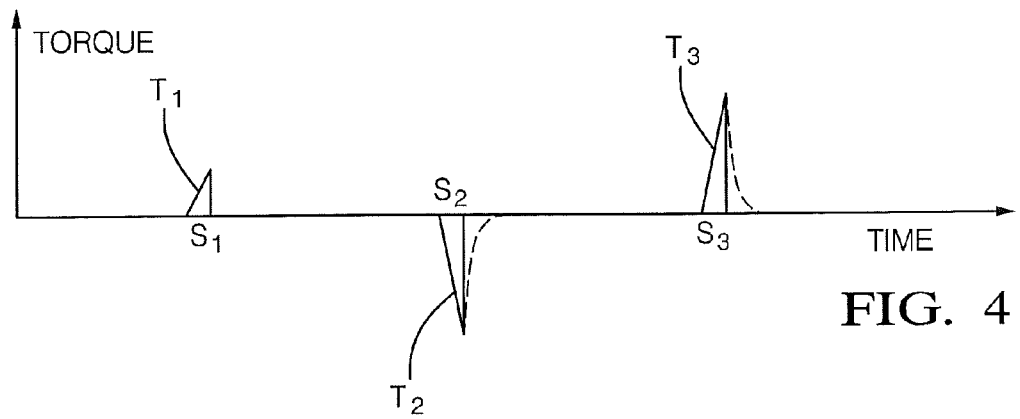
FIG. 4 is an alternative torque cue configuration for the system of FIG. 2.
Figure 5:
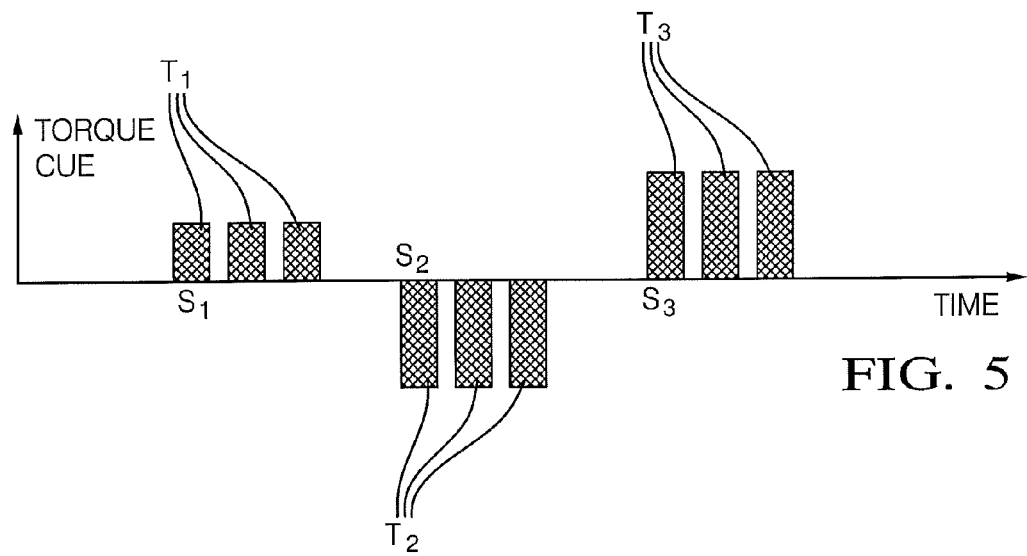
FIG. 5 is an alternative torque cue configuration including multiple torque pulses for the system of FIG. 2.
Figure 6:
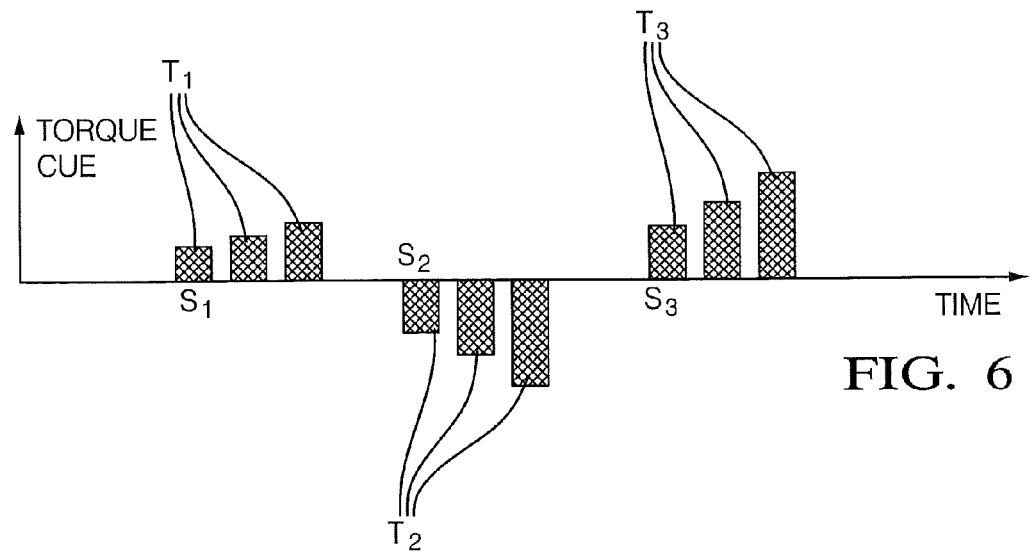
FIG. 6 is an alternative torque cue configuration including multiple torque pulses of varying magnitude for the system of FIG. 2.

In some embodiments, the torque pulses $T_1$, $T_2$ and $T_3$ may be single pulses as shown in FIG. 2, or the pulses may vary in duration, magnitude, and/or quantity. FIG. 4 illustrates pulses $T_1$, $T_2$ and $T_3$ as single pulses with increasing magnitude over time. FIG. 5 illustrates each of pulses $T_1$, $T_2$ and $T_3$ as multiple pulses, each of equal magnitude, while the pulses of FIG. 6 are multiple pulses with each subsequent pulse increasing in magnitude over the previous pulse.

Figure 7:
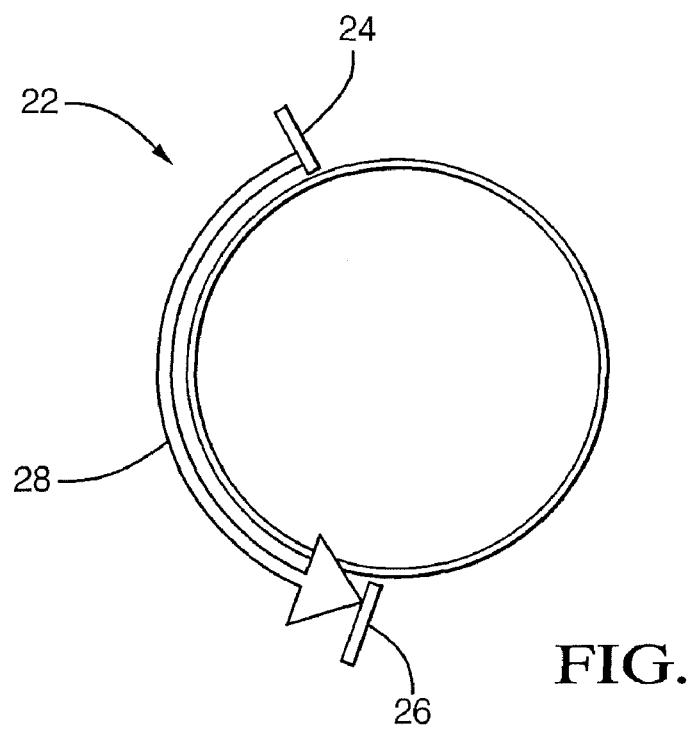
FIG. 7 is an example of a visual cue.

In some embodiments, visual cues 22 such as shown in FIG. 7, for example, may be included to complement the torque pulses, $T_1$, $T_2$, and $T_3$, and/or continuous torques $T_4$ and $T_5$. The first indicator 24 illustrates a current position of the steering wheel, while the second indicator 26 illustrates a desired position of the steering wheel and the arrow 28 indicates a necessary direction of rotation of the steering wheel to reach the desired position of the steering wheel indicated by the second indicator 26. The visual cue 22 must be visible to the driver while the driver is looking rearward during the parking maneuver. Possible locations for the visual cue 22 include, for example, displaying it on a rear windshield of the vehicle, or displaying it on a device that could be pulled down from ceiling of the vehicle near the rear windshield. An additional display in the front of the vehicle would be complementary to one in the rear of the vehicle.

Figure 8:
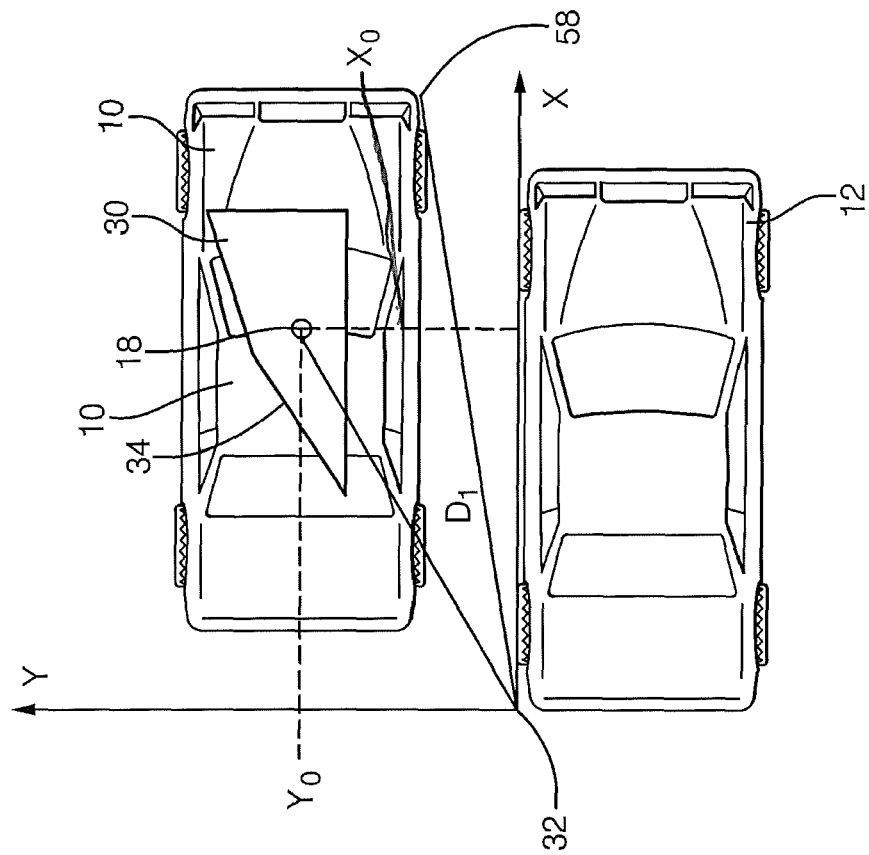
FIG. 8 is another plan view of a typical parking situation and staging.
Figure 8:
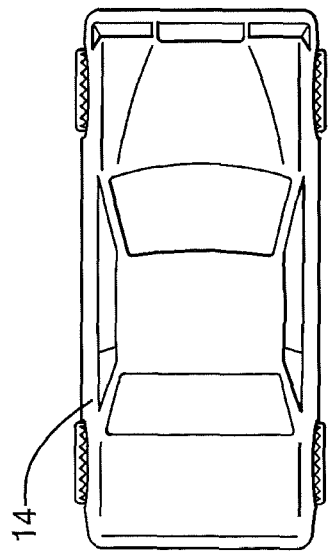

An important consideration in providing steering cues is an initial position of the vehicle 10. Shown in FIG. 8 is a typical parking situation. The staging zone 30 illustrates where the center of gravity 18 must be located with respect to a left rear corner 32 of the parked vehicle 12 for the parking maneuver to be successful. When the vehicle 10 is driven rearward, for instance with no heading angle offset and with straight steering wheel angle, as the vehicle starts going straight backward from its stationary position, the steering wheel must begin to be turned when the center of gravity 18 crosses staging zone border 34. The greater the distance $y_0$ the center of gravity 18 is from the parked vehicle 12, the sooner along axis x steering wheel turning must be initiated. The particular shape of the staging zone 30 may vary based on the shape of the vehicle 10, whether a large heading angle offset is permitted at staging, or whether a motion other than directly rearward is allowed while the center of gravity 18 is inside the staging zone 30 and other factors. Because the steering cues are to correspond to a successful steering profile and the staging zone 30, the location of the first steering cue along the x axis is a substantially linear function of the initial lateral distance $y_0$ as depicted by the boundary line 34 of the staging zone 30. This holds for the case where the vehicle's initial heading angle is close to zero and it is driven directly rearward within the staging zone 30. Alternative steering profiles and staging zones are possible and would result in similar methodology for determining the steering cues.

Figure 9:
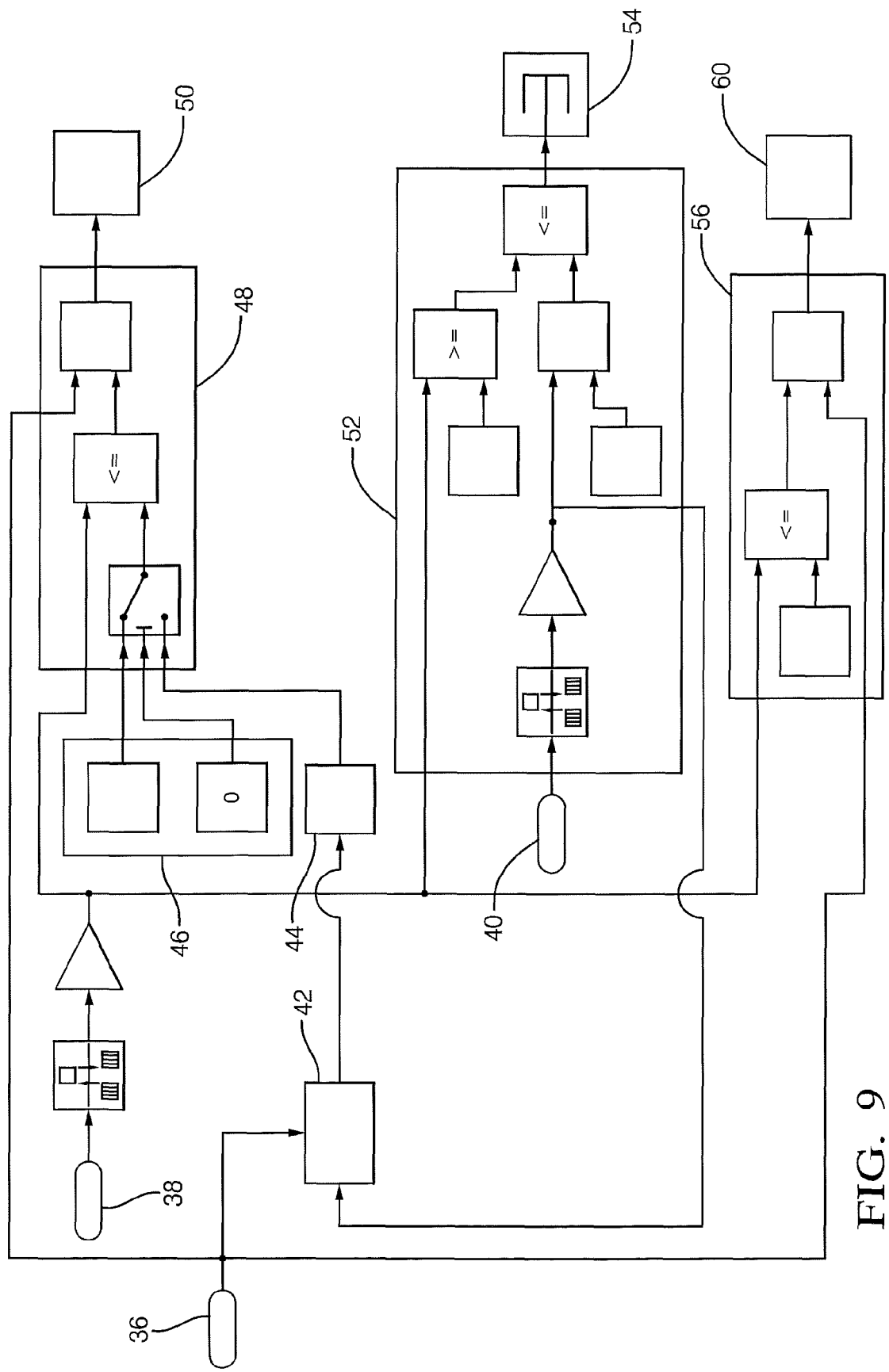
FIG. 9 is a schematic of an algorithm utilized in the system of FIG. 2.

An algorithm for determining the location along the x-axis to begin providing steering cues is illustrated in FIG. 9. A first input 36 is an enable that starts a Parking Assist with Steering Cues mode. This is typically activated by the driver through an interface (audio, click, etc.). A second input 38 and a third input 40 are measurements of x and y of the center of gravity 18 relative to the parked car 12 (see FIG. 8). The x and y measurements can be provided by a variety of sensors such as ultrasonic, GPS, radar, etc. Furthermore, it is not necessary to directly measure the x and y of the center of gravity 18. Other points in the vehicle 10 could be utilized as well, and the x and y of the center of gravity 18 could be derived therefrom.

To determine the initial lateral position $y_0$, a trig_stage_zone subsystem 42 is used. It takes in the real time y value and since the trig stage zone subsystem 42 is triggered by the first input 36, an output will be the lateral distance $y_0$ at a time the driver provides the first input 36. An X_tresh_RT block 44 receives $y_0$ from the trig_stage_zone subsystem 42 and outputs the longitudinal location of the first cue or $X_1$, based on:

$X_1 = m Y_0 + b$, where m and b are constants representing the boundary 34 of the staging zone 30. A decision 46 is made whether the calculated $X_1$ or a fixed $X_{1a}$ is to be used, followed by a continual comparison 48 between X and $X_1$ as the vehicle 10 is driven directly rearward. Once X is less than $X_1$, the first steering pulse, $T_1$, is generated by a trig_pulse block 50.

A staging check system 52 evaluates whether the vehicle 10 is within the staging zone 30 or not. The staging check system 52 may output a stage_zone_ok signal 54 to the driver, if desired.

A second torque system 56 triggers a second torque pulse $T_2$. $T_2$ is triggered by continually comparing X with a constant value for $X_2$ (such as −1.8). Note that it has been experimentally verified that unlike $X_1$, $X_2$ is not sensitive to initial staging variation. Also note that triggering of the second torque pulse $T_2$ may be achieved by comparing Y to a second constant. Alternatively, the triggering of $T_2$ may be achieved by comparing a distance $D_1$ between a front right corner 58 of vehicle 10 and the rear left corner 32 of the parked vehicle 12 to a third constant (see FIG. 8). Further, the triggering of $T_2$ can be achieved by generating and comparing a heading angle of the vehicle 10 against a fourth constant. Once the vehicle 10 is at the appropriate location, X equaling $X_2$, the second torque pulse, $T_2$, is generated by trig_pulse1 block 60.

If the vehicle 10 is to be driven directly rearward while the center of gravity 18 is in the staging zone 30, variation in $X_1$ is due to variations in the initial location $X_0$, $y_0$ of the center of gravity 18 of the vehicle 10. The driver's driving style is, by definition, irrelevant. On the other hand, the location of $X_2$ for application of $T_2$ is influenced by the driver's driving style. For example, a speed at which the vehicle 10 is moving, the magnitude the driver turns the steering wheel, and speed at which the driver turns the steering wheel are factors in determining the optimal location to apply $T_2$.

FIG. 1 illustrates an initial ideal steering wheel profile as a function of station. The ideal profile is perhaps better achievable with an actuator of some kind with driver's hands off the wheel. Since station is defined as an arc length along the path of the center of gravity 18, it will be conveniently determinable as an integral of the vehicle speed. Thus if the driver decides to bring the vehicle 10 to a halt, the ideal steering wheel location will not change as long as the vehicle is stationary. The steering cues which follow the lead of the ideal steering wheel rotation will also need to be position based as opposed to time based, if the vehicle speed variations are to be taken into account. Furthermore, an exact shape of the ideal profile is a function of the vehicle speed. Generally speaking, the faster the vehicle 10 is moving, the faster the steering wheel must be turned for the vehicle 10 to traverse through the same path. Therefore, one can imagine that the profile shown in FIG. 1 corresponds to a vehicle 10 traveling at an average, or ideal, speed.

Figure 10:
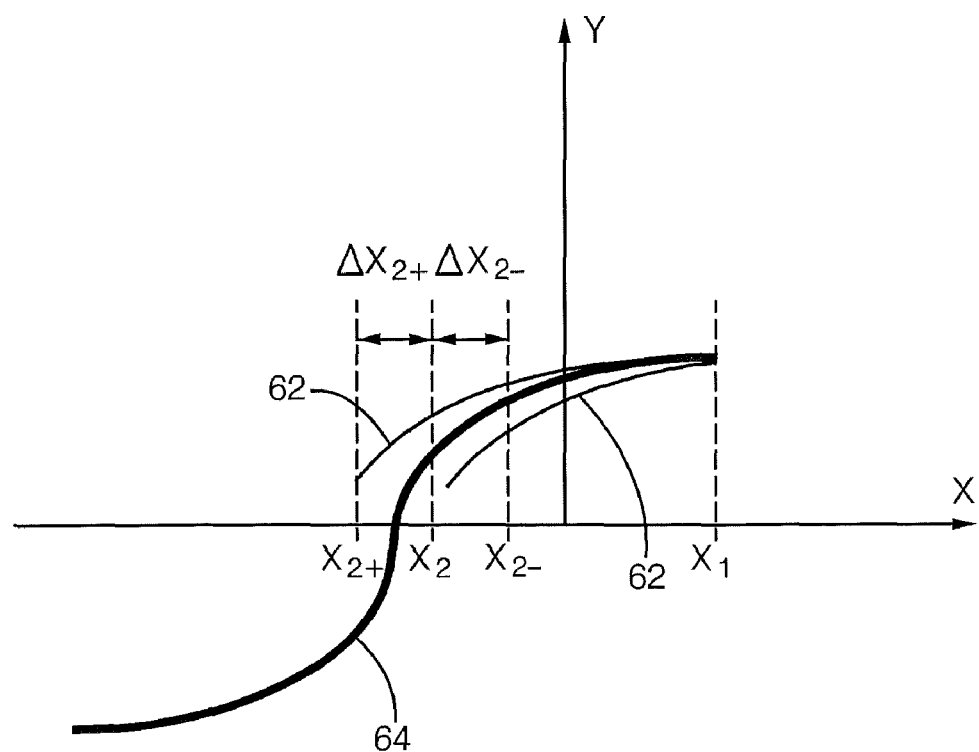
FIG. 10 is an illustration of variation in vehicle location profiles relative to an ideal vehicle location profile.

As shown in FIG. 10, one approach to modifying the location $X_2$ of $T_2$ is to determine a real time steering wheel profile 62 while the driver is turning the steering wheel. An ideal steering wheel profile 64 corresponding to an ideal center of gravity profile is compared to the real time steering wheel profile 62 and an error signal, e, is found that can be integrated for a desired duration past $X_1$. The integrals may be expressed as:

$$I = \int e(t)dt \text{ or } I = \int e(s)dS$$

If I is positive, it indicates that the driver has been aggressive in turning the steering wheel ahead of the steering wheel ideal profile 64. If for that interval, an average vehicle speed has been greater than the ideal, the location $X_2$ is not altered. However, if the average vehicle speed has been close to or less than the ideal vehicle speed, $T_2$ is provided at a location $X_{2+}$ which is past the original location of $X_2$. This allows the vehicle path to become closer to the ideal profile 64. The amount of change in the location of steering cue, $\Delta X_{2+}$, is proportional to I.

On the other hand if I is negative, it indicates that the driver has been passive in turning the steering wheel. In particular, if that has occurred while the vehicle 10 has been moving at a higher speed, on the average, compared to the ideal speed, $T_2$ is provided at location $X_{2-}$ which is before the original location of $X_2$. This allows the vehicle path to again move closer to the ideal profile 64. If the average vehicle speed has been lower than the ideal speed while I was negative, no change in $X_2$ is made. The amount of change in the location of steering cue, $\Delta X_{2-}$, is proportional to I.

Alternatively, a process comparing an actual average steering wheel speed when the vehicle 10 is past $X_1$ to an ideal steering wheel speed for the same interval may be used. The driver would be considered passive if the actual average steering wheel speed is less than the ideal steering wheel speed, and active when the actual steering wheel speed exceeds the ideal steering wheel speed. With the same considerations for vehicle speed as described above, the same consequences would apply in terms of moving the application of $T_2$ relative to $X_2$. This approach does not require real time computation of the ideal profile.

In addition to the location of $T_2$, its amplitude, duration, and/or its number of occurrences may be changed. For example, when the driver is passive after the application of $T_1$, $T_2$ could occur before the vehicle 10 reaches $X_2$, with more amplitude, with more duration, and/or it may even be a double pulse or the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention.

The invention claimed is:

1. A method for assisting the parking of a vehicle comprising:
   determining an initial vehicle position relative to an obstacle;
   when the relative vehicle position is at a first station position, delivering a cue in the form of a momentary first torque pulse to the steering wheel in a first direction to cue an operator of the vehicle to turn the steering wheel in the first direction; and
   when the relative vehicle position has moved to a second station position different than the first station position, delivering a cue in the form of a momentary second torque pulse to the steering wheel in a second direction, opposite to the first direction to cue the operator to turn the steering wheel in the second direction.

2. The method of claim 1 wherein the second torque pulse is of a greater magnitude than the first torque pulse.

3. The method of claim 1 including delivering a third torque pulse to the steering wheel when the relative vehicle position is at a third station position to cue the operator to return the steering wheel to a neutral position and complete the parking.

4. The method of claim 1 wherein in response to the steering wheel being turned in the first direction to a first angle greater than a desired first angle, a first continuous torque is delivered to the steering wheel to prevent further turning of the steering wheel in the first direction.

5. The method of claim 4 wherein the first continuous torque has a magnitude in proportion to the amount of turning greater than the desired first angle.

6. The method of claim 1 wherein in response to the steering wheel being turned in the second direction to a second angle greater than a desired second angle, a second continuous torque is delivered to the steering wheel to prevent further turning of the steering wheel in the second direction.

7. The method of claim 6 wherein the second continuous torque has a magnitude in proportion to the amount of turning greater than the desired second angle.

8. The method of claim 1 wherein subsequent to a delivery of the first torque pulse, a first bias torque is delivered to assist in turning the steering wheel in the first direction.

9. The method of claim 1 wherein subsequent to the delivery of the second torque pulse, a second bias torque is delivered to assist in turning the steering wheel in the second direction.

10. The method of claim 1 wherein a visual cue is delivered to the operator in addition to the first torque pulse and/or the second torque pulse.

11. The method of claim 10 wherein the visual cue is visible to the operator when the operator is looking toward the rear of the vehicle.

12. The method of claim 1 including determining that the vehicle is within a staging zone prior to initiation of a parking maneuver.

13. The method of claim 12 wherein the determination that the vehicle is within the staging zone is made utilizing inputs from one or more position sensors.

14. The method of claim 12 wherein a position of the vehicle in the staging zone prior to initiation of the parking maneuver is utilized to determine the first station position and/or the second station position.

15. The method of claim 1 wherein determining if the relative vehicle position is at a first station position is achieved by comparing a longitudinal position of the vehicle to a first desired longitudinal position of the vehicle.

16. The method of claim 1 wherein determining if the relative vehicle position is at a second station position is achieved by comparing the longitudinal position of the vehicle to a second desired longitudinal position of the vehicle.

17. The method of claim 1 wherein the initial vehicle position relative to the obstacle is determined by the vehicle speed.

18. The method of claim 1 including modifying a location of the second station position during the parking maneuver.

19. The method of claim 18 wherein modifying the location of the second station position is based on a comparison of actual steering wheel positions to ideal steering wheel positions and on an average vehicle speed between the first station position and the second station position.

20. The method of claim 18 wherein modifying the location of the second station position is based on an average steering wheel speed and an average vehicle speed between the first station position and the second station position.

21. A system for assisting the parking of a vehicle comprising:
at least one sensor for determining an initial position of a vehicle relative to an obstacle; and
a torque generator in operable communication with a steering wheel wherein:
when the position of the vehicle relative to the obstacle is at a first station position, the torque generator is capable of delivering a first non-continuous torque pulse to the steering wheel in a first direction to cue an operator of the vehicle to turn the steering wheel in the first direction; and
when the position of the vehicle relative to the obstacle has moved to a second station position that is different from the first station position, the torque generator is capable of delivering a second non-continuous torque pulse to the steering wheel in a second direction, opposite to the first direction to cue the operator to turn the steering wheel in the second direction.

22. The system of claim 21 wherein the torque is capable of delivering a third torque pulse to the steering wheel when the position of the vehicle relative to the obstacle is at a third station position to cue the operator to return the steering wheel to a neutral position and complete the parking.

23. The system of claim 21 wherein in response to the steering wheel being turned in the first direction to a first angle greater than a desired first angle, a fourth torque is delivered to the steering wheel to prevent further turning of the steering wheel in the first direction.

24. The system of claim 21 including a visual cue delivered to the operator in addition to the first torque pulse and/or the second torque pulse.

25. The system of claim 21 wherein the vehicle speed is utilized to determine the vehicle position.

26. A method for assisting a driver in the manual parking of a vehicle comprising:
determining an initial vehicle position relative to an obstacle;
delivering a cue to the driver in the form of a momentary first torque pulse to the steering wheel in a first direction to signal the driver to manually turn the steering wheel in the first direction, when the relative vehicle position is in a first station position;
determining a second station position as a function of a set of criteria; and
delivering a cue to the driver in the form of a momentary second torque pulse to the steering wheel in a second direction to signal the driver to manually turn the steering wheel in the second direction, opposite to the first direction, when the relative vehicle position has moved to a second station position, the second station position different than the first station position.

* * * * *